No. 637,467. Patented Nov. 21, 1899.
F. R. JOHNSON, W. RUBIN & G. BRADLEY.
BAIL EAR.
(Application filed Apr. 19, 1898.)
(No Model.)
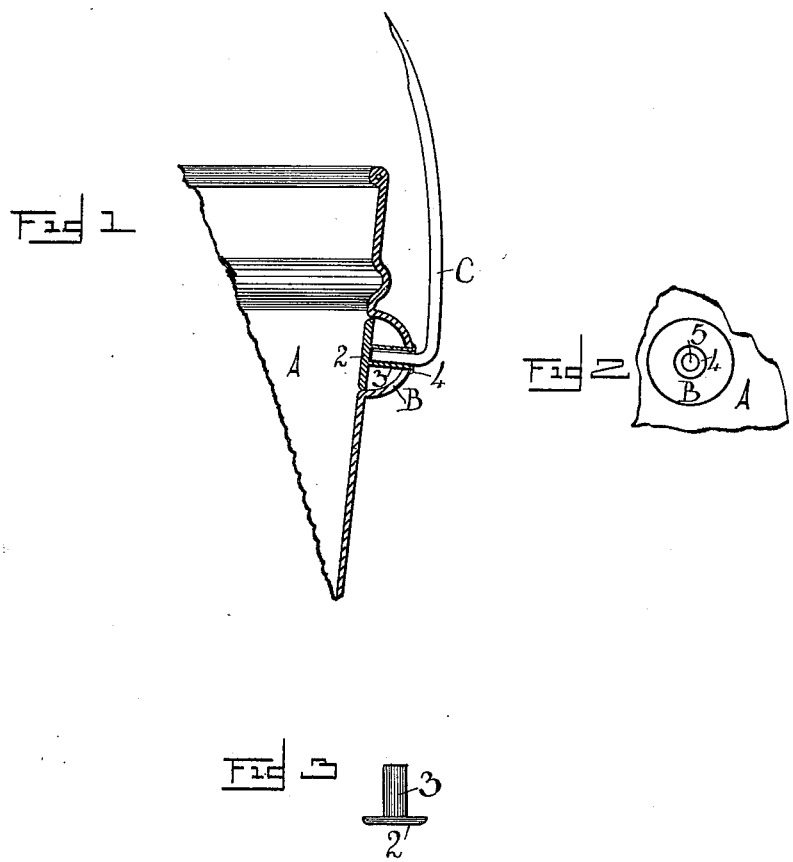
WITNESSES:
D. O. Barnell.
Mamie Marr
Frank R. Johnson
William Rubin
George Bradley.
INVENTORS.
BY
ATTORNEY.

United States Patent Office.

FRANK R. JOHNSON, WILLIAM RUBIN, AND GEORGE BRADLEY, OF SOUTH OMAHA, NEBRASKA.

BAIL-EAR.

SPECIFICATION forming part of Letters Patent No. 637,467, dated November 21, 1899.

Application filed April 19, 1898. Serial No. 678,184. (No model.)

*To all whom it may concern:*

Be it known that we, FRANK R. JOHNSON, WILLIAM RUBIN, and GEORGE BRADLEY, residing at South Omaha, in the county of Douglas and State of Nebraska, have invented certain useful Improvements in Bail-Ears; and we do hereby declare that the following is a full, clear, and exact description of the invention, such as will enable others skilled in the art to which it appertains to make and use the same, reference being had to the accompanying drawings, which form a part of this specification.

This invention has relation to a novel improvement in bail-ears.

The object of our invention is to provide a simple economic device whereby bail-ears may be attached to vessels without requiring the use of solder.

In furtherance of the aim of our invention we provide the vessel to receive our improved bail-ear with a depression into which we insert a hollow-stemmed rivet, provided with a head of a size adapted to neatly fit into the depression, while the stem passes through the same to be clenched, so forming a water-tight connection. A bail-ear so constructed is adapted to removably hold a bail, the surface of the vessel upon the side being smooth and unbroken, while upon the opposite side is formed the bulge to receive the rivet.

In the accompanying drawings, Figure 1 shows a broken detached portion in section of a sheet-metal vessel provided with one of our improved bail-ears, showing the bail as connected. Fig. 2 shows a broken portion disclosing a front view of the vessel, while Fig. 3 shows a detail of the rivet used in connection with our invention.

Our invention embodies, essentially, a hollow-stemmed rivet, which is placed within a depression forming part of a vessel, and into this depression is inserted the head 2 of a shape conforming to the shape of the depression and of any suitable size or material, from which head extends the hollow stem 3.

The vessel to which our improved bail is to be attached may be of any suitable material, such as papier-mâché or sheet metal, the vessel being provided with a depression preferably extending outward, as is shown in Fig. 1, where A represents the broken section of an ordinary tin vessel, which is provided with an outwardly-extending portion or bulge B, which upon the inside forms a depression, but upon the outside the boss, which is provided with an opening of a size to snugly accommodate the stem 3 of the rivet, the projecting end of which is next flanged outward to provide the flange 4, forming a water-tight connection. The head 2 is so sized that the inner surface of the vessel will offer an unobstructed surface, as is clearly shown in Fig. 1, the bail-ear extending outward. It is of course understood that the bail-ear could also be made to extend inward without departing from the spirit of our invention. Into this hollow stem 3 is next inserted the end of an ordinary suitable-sized bail C, as is shown in Fig. 1.

Now, having thus described our said invention, what we claim as new, and desire to secure by United States Letters Patent, is—

1. The combination with a vessel having a recess therein, of a rivet in said recess having an imperforate flat head and a longitudinally-hollow shank, the said shank being adapted to receive the end of a bail.

2. The combination with a vessel having a recess in its inner surface forming a bulge or projection on its outer surface, the same being provided with an opening, of a rivet in said recess having a flat head and a hollow shank, the said shank being extended through said opening and upset, and adapted to receive the end of a bail.

3. The combination with a vessel having a recess therein provided with an opening, of a hollow rivet whose stem extends through said opening and is upset, thereby closing said opening, and whose head lies flush with the surface of said vessel.

4. The combination with a vessel having a recess in its inner surface forming a bulge or projection on its outer surface, the same being provided with an opening, of a hollow-stemmed rivet whose stem extends through said opening and is flanged about the same, and whose head fits in said recess and lies flush with the inner wall of the vessel.

In testimony whereof we affix our signatures in presence of two witnesses.

FRANK R. JOHNSON.
WILLIAM RUBIN.
GEORGE BRADLEY.

Witnesses:
JOSEPH MADDEN,
FREDERICK KEELER.